Figure 1:
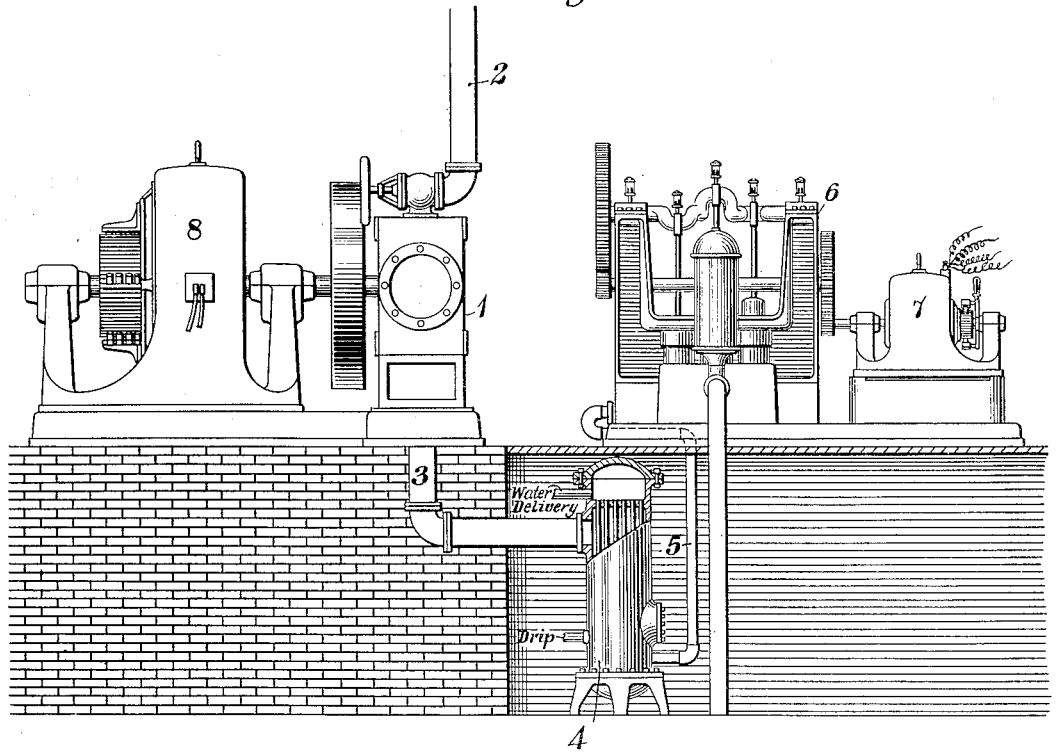

No. 851,719. PATENTED APR. 30, 1907.
R. WIKANDER.
CONDENSER PUMP REGULATOR.
APPLICATION FILED JULY 24, 1905.

2 SHEETS—SHEET 1.

WITNESSES:
C. L. Belcher
R. J. Dearborn

INVENTOR
Ragnar Wikander
BY
Okley G. Carr
ATTORNEY

No. 851,719. PATENTED APR. 30, 1907.
R. WIKANDER.
CONDENSER PUMP REGULATOR.
APPLICATION FILED JULY 24, 1905.

2 SHEETS—SHEET 2.

WITNESSES:
C. L. Belcher
R. J. Dearborn

INVENTOR
Ragnar Wikander
BY
Wesley G. Carr
ATTORNEY

UNITED STATES PATENT OFFICE.

RAGNAR WIKANDER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONDENSER-PUMP REGULATOR.

No. 851,719.      Specification of Letters Patent.      Patented April 30, 1907.

Application filed July 24, 1905. Serial No. 271,096.

*To all whom it may concern:*

Be it known that I, RAGNAR WIKANDER, a subject of the King of Sweden, and a resident of Edgewood Park, in the county of Allegheny and State of Pennsylvania, have invented a new and useful Improvement in Condenser-Pump Regulators, of which the following is a specification.

My invention relates to the regulation of steam condenser pumps, and particularly to means for regulating the amount of water supplied to condensers which are adapted for use with steam driving engines.

The object of my invention is to provide means for automatically varying the amount of water supplied to condensers which are used in connection with steam driving engines, that shall be simple in arrangement and construction, effective in operation and that shall vary the amount of water supplied as the load and the steam consumption of the engine vary.

The amount of water supplied to steam engine condensers has usually been approximately constant and entirely independent of the steam consumption of the engine. Constant speed electric motors have often been employed for driving condenser pumps, and in some instances, thermostatic instruments have been introduced to vary the amount of water in proportion to the temperature in the condenser. Such thermostatic regulators have usually been of expensive and intricate construction or unsatisfactory in operation, so that their application has been limited. It is evident that if water is supplied to a condenser at a constant rate adequate for condensation under conditions of maximum speed consumption, the amount supplied will often exceed the amount necessary under working conditions where the engine is operated under variable load.

When steam engines are employed for driving dynamo-electric machinery, the steam consumption of the engine varies with the current delivered from the electric machine, so that, by varying the speed of the motor that drives the condenser pump as the generated electric current is varied, the amount of water supplied to the condenser may be automatically kept substantially proportional at all times to the steam consumption of the engine.

My invention is hereinafter illustrated and described in connection with an electric generating system as a convenient means for effecting a desired result, but is not restricted to any specific system and may be applied to a steam engine adapted for various loads.

My invention is illustrated in the accompanying drawings, in which

Figure 2:
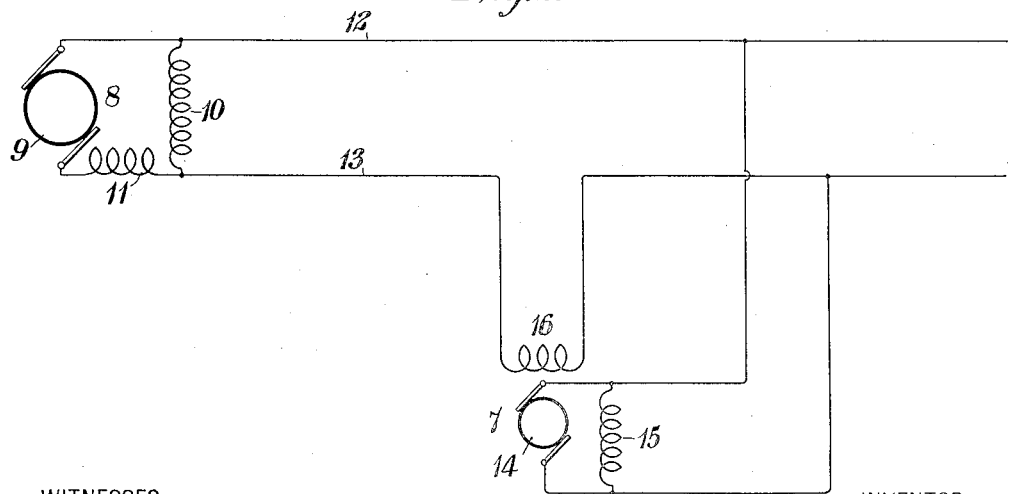
Figure 4:
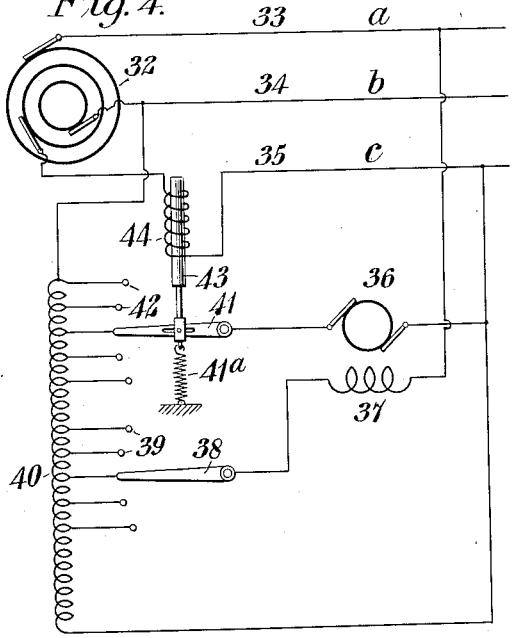
Figure 5:
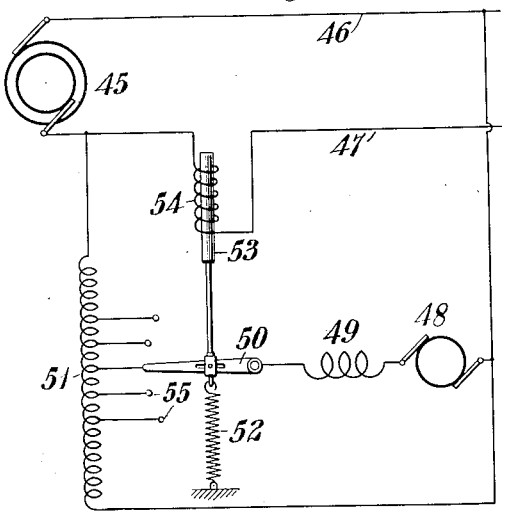

Figure 1 is a diagrammatic view of a system of condenser pump regulation as applied to an electric generating system and constructed in accordance therewith. Fig. 2 is a diagrammatic view of the circuit connections for a system embodying a direct current electric generating unit, and Figs. 3, 4 and 5 are similar views of the circuit connections for systems embodying, respectively, two, three and one-phase generators.

Referring to Fig. 1, a steam driving engine 1 is supplied with steam through a pipe 2 and exhausts through a pipe 3 into a condenser 4 which is supplied with condensing water through a pipe 5 by a pump 6 which is driven by an electric driving motor 7. The engine 1 is adapted to drive an electric generator 8, which may supply current energy for various loads, including the driving motor 7. The electrical connections for the system are disclosed in the diagrams of Figs. 2, 3, 4 and 5.

Referring to Fig. 2, a direct current, compound wound generator 8 comprising an armature 9, a shunt field magnet winding 10 and a series field magnet winding 11 supplies energy to an external circuit 12—13. The direct current driving motor 7 which is connected to the pump 6 is supplied with energy from the line 12—13, across which its armature 14 and shunt field magnet winding 15 are connected in the usual manner. The motor is provided with a second field magnet winding 16, which is connected in series with the interrupted line conductor 13, so that the entire current load on the generator passes therethrough and acts in opposition to the shunt field magnet winding 15. By proper regulation of the number of turns on the two field magnet windings 15 and 16, the speed of the motor 7 may be increased as the load on the generator increases and decreased when the load on the generator decreases, so that the amount of water delivered to the condenser 4 by the pump 6 will vary, within predetermined limits, as the load on the generator 8 varies and, therefore, will be kept roughly proportional to the steam consumption of the engine 1.

Figure 3:
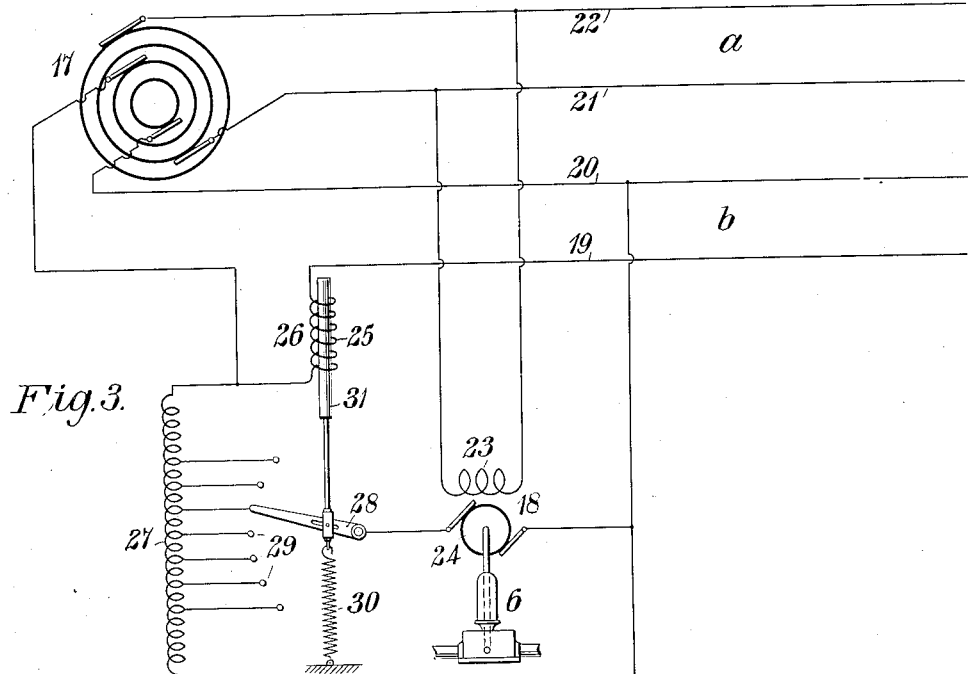

Referring to Fig. 3, a two-phase alternating current generator 17 is substituted for the direct current generator 8 of Fig. 2 and an alternating current commutator motor 18 takes the place of the driving motor 7. The two-phase generator 17 supplies energy to the external circuits 19—20 and 21—22 to which the motor 18 is connected, the field magnet winding 23 of the motor being connected across the circuit 21—22, which may be designated as phase a, and the armature 24 of the motor being supplied with energy from circuit 19—20, which may be designated as phase b. A magnetizing winding 25 of an electro-magnet 26 is connected in series with the conductor 19, and an auto-transformer 27 is connected across the supply line 19—20. One terminal of the armature 24 of the motor 18 is connected to the line conductor 20 and the other terminal is connected to a movable contact arm 28 which engages a plurality of contact members 29 that are electrically connected to various taps in the auto-transformer 27 and is automatically actuated, in opposition to a spring 30, to engage the various contact members 29, by an armature 31 of the electro-magnet 26. In this way, the action of the electro-magnet 26 regulates the speed of the motor and is dependent upon the current in the external circuit of the generator, so that the voltage applied to the motor is varied with the load on the generator.

Referring to Fig. 4, a three-phase alternating current electric generator 32 corresponds to the generators 8 and 17 of Figs. 2 and 3 and supplies energy to the external circuit 33, 34 and 35, which constitute, respectively, phases a, b and c. A motor 36, which is similar to the motor 18 of Fig. 3, is used to drive a condenser pump and is supplied with energy from the external circuit of the alternating current generator 32. A circuit is completed from the conductor 33, through a field magnet winding 37 of the motor 36 and a movable contact arm 38, which engages any one of a plurality of contact members 39 that are connected to various taps near the middle point of an auto-transformer 40, which is connected across lines 34—35. A circuit is also completed from the line conductor 35 through the armature of the motor 36 and a movable contact arm 41 which engages any one of a plurality of contact members 42 that are connected to various taps in the auto-transformer 40. The movable contact arm 41 is actuated in opposition to a spring 41ª by an armature 43 of an electro-magnet 44, which is connected in series with the line conductor 35 and automatically varies the voltage applied to the motor armature as the load on the generator is varied.

Referring to Fig. 5, single-phase alternating current energy is supplied from a generator 45 to an external circuit 46—47 and to a single-phase, commutator motor 48 one terminal of which is connected to the line conductor 46 from which a circuit is completed through a series field magnet winding 49 and a movable contact member 50 to an auto-transformer 51. The movable contact member 50 is actuated in opposition to a spring 52 by an armature 53 of an electro-magnet 54, that is connected in series with the line conductor 47, to engage any one of a plurality of contact members 55 which are connected to a series of taps in the auto-transformer 51 that is connected across the line 46—47. The current taken from the generator passes through the winding of the electro-magnet 54 and automatically varies the voltage applied to the motor and consequently its speed by connecting the movable contact arm to different transformer taps.

Variations in circuit connections and similar means for obtaining like results which do not depart from the spirit of my invention are included within its scope.

I claim as my invention:

1. The combination with a steam driving engine and a condenser therefor, of a pump for supplying water to said condenser, an electric motor for driving said pump and a speed-governing means for said motor that is directly dependent upon the load carried by the engine.

2. The combination with a dynamo-electric generator, a steam driving engine therefor, a condenser and a supply pump for said engine, and an electric driving motor for said pump, of means dependent upon the current from said generator for regulating the speed of the driving motor.

3. The combination with an electric generator, a steam driving engine therefor and an electric motor-driven condenser pump for said engine, of means for varying the amount of water supplied to a condenser by said pump as the load delivered by said generator is varied.

4. The combination with an electric generator, a steam driving engine therefor, a condenser and supply pump for said engine, and an electric driving motor for said pump that is supplied with energy from said generator, of means for varying the speed of the driving motor as the energy delivered from said generator varies.

5. The combination with a dynamo-electric machine, a steam driving engine therefor, a condenser and supply pump for said engine, and an electric driving motor for said pump, of means for varying the amount of water supplied to said condenser as the energy delivered from said dynamo-electric machine is varied.

6. The combination with a steam engine, a condenser therefor and an electric generator driven thereby, of means for varying the amount of water supplied to said condenser as the current delivered by said generator is varied.

7. The combination with a direct current electric generator, a steam driving engine therefor, a condenser, and a supply pump therefor, of a direct current, compound wound, electric driving motor for said pump having means for varying its speed as the generator load varies.

8. The combination with a direct current electric generator, a steam driving engine therefor, a condenser and supply pump for said engine and a direct current, compound wound, electric driving motor for said pump, of means for varying the speed of the motor substantially in proportion to the steam consumption of the engine that comprises a shunt field magnet winding connected in opposition to a field magnet winding that is in series with the external circuit of the direct current generator.

9. The combination with a steam engine, an electric generator driven thereby and a condenser therefor, of means for varying the amount of water supplied through an electric motor-driven pump to said condenser as the load delivered by said generator is varied that comprises a field winding for said motor that is series-connected with the external circuit of said generator.

10. The combination with a steam engine, an electric generator driven thereby, and a condenser therefor supplied with water by an electric motor-driven condenser pump, of means for varying the amount of water supplied to said condenser as the amount of current delivered by said generator varies, that comprises a field winding for said motor connected in series with the external circuit of said generator.

11. The combination with a steam engine and a condenser therefor, of a pump for supplying water to the condenser, an electric motor for driving the pump and means for varying the energy supplied to a winding of the motor in accordance with variations of load on the engine.

In testimony whereof, I have hereunto subscribed my name this 14th day of July, 1905.

RAGNAR WIKANDER.

Witnesses:
JOE PAULSON,
BIRNEY HINES.